June 28, 1927.   D. E. ANDERSON   1,634,131
VEHICLE HAVING FOUR-WHEEL BRAKES
Filed Jan. 31, 1923   2 Sheets-Sheet 1
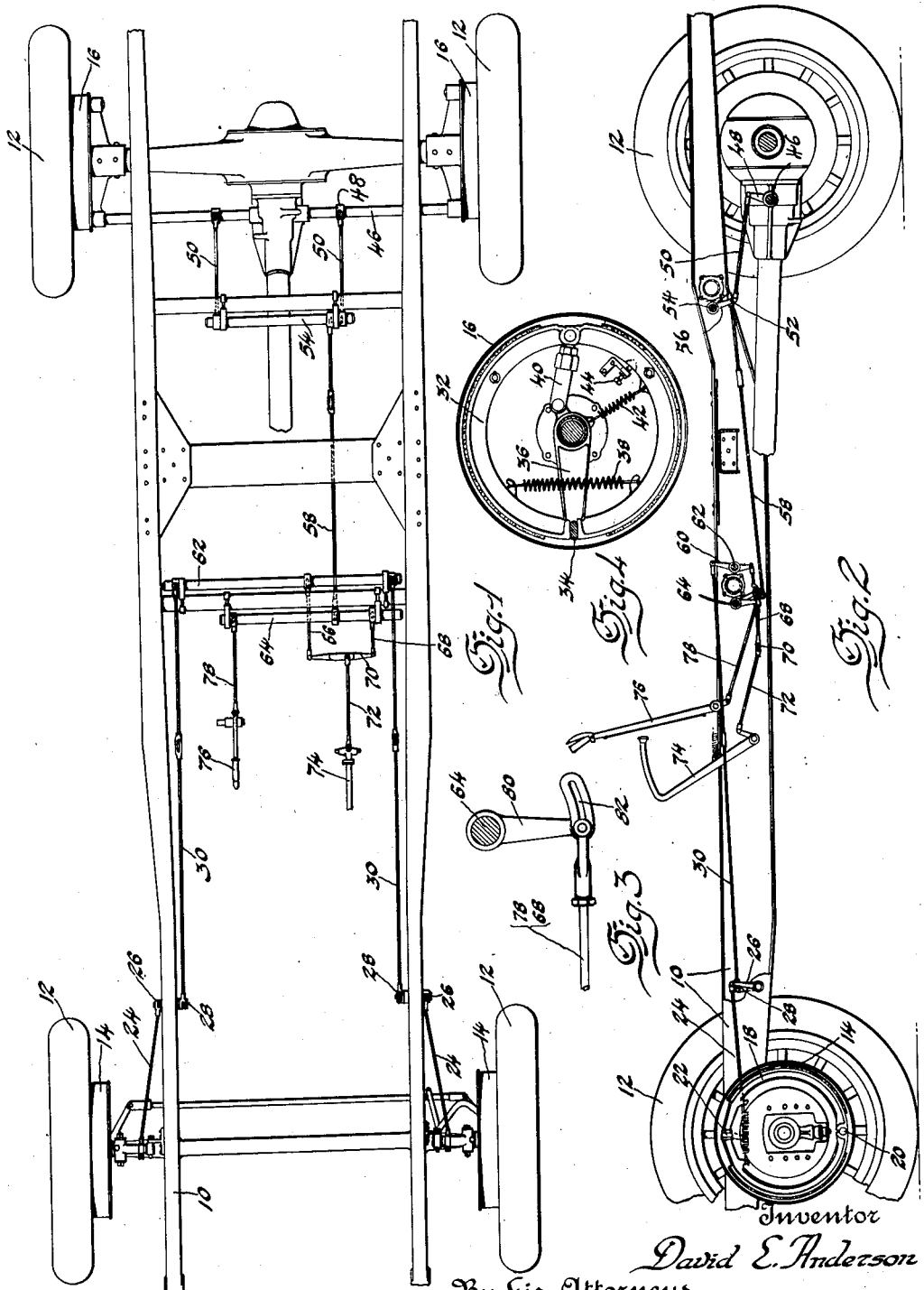
Inventor
David E. Anderson
By his Attorneys
Blackmore, Spencer & Flint.

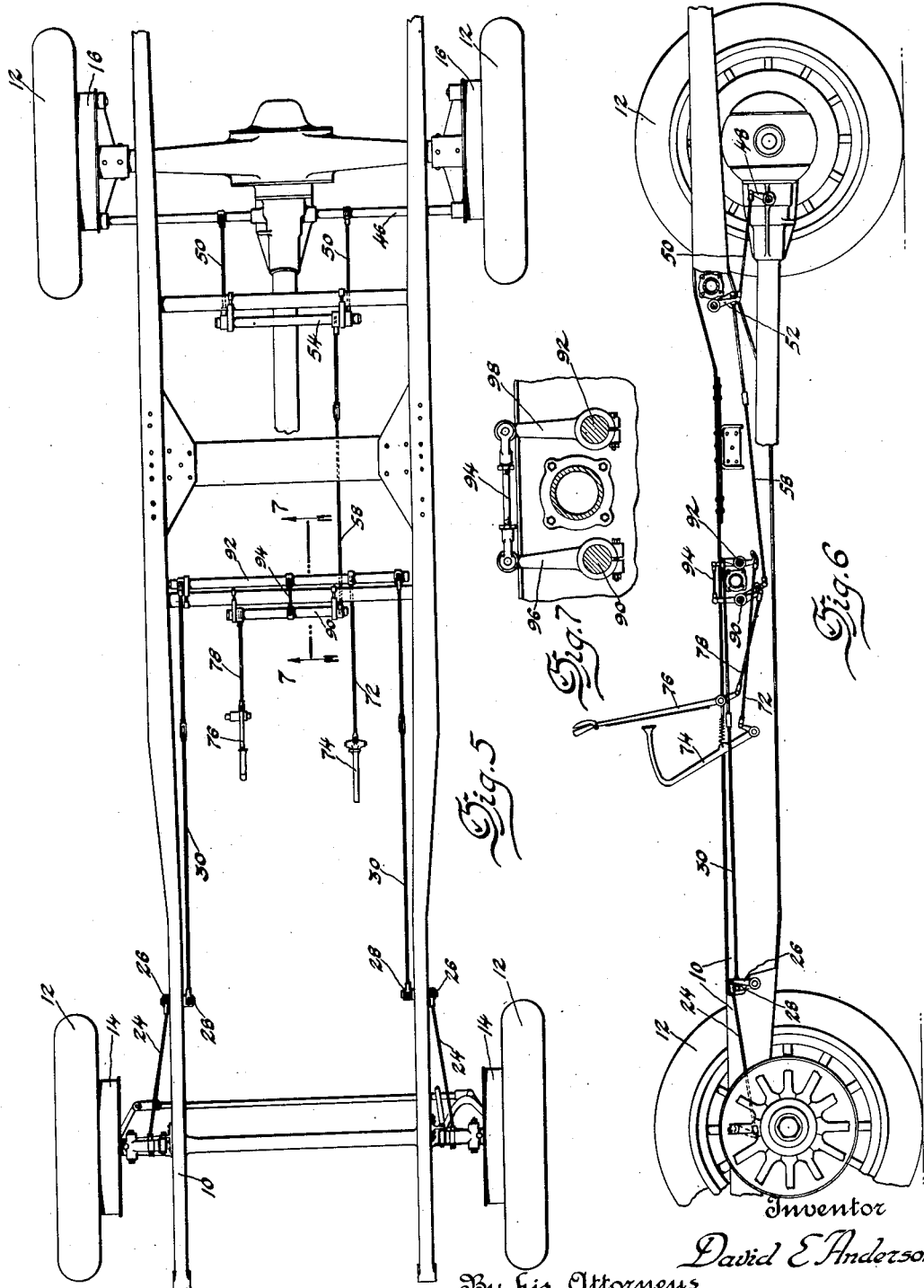

Patented June 28, 1927.

1,634,131

UNITED STATES PATENT OFFICE.

DAVID E. ANDERSON, OF DETROIT, MICHIGAN, ASSIGNOR TO GENERAL MOTORS CORPORATION, OF DETROIT, MICHIGAN, A CORPORATION OF DELAWARE.

VEHICLE HAVING FOUR-WHEEL BRAKES.

Application filed January 31, 1923. Serial No. 616,099.

This invention relates to vehicles having brakes on all four wheels, and is illustrated as embodied in an automobile having a novel system of brake-operating connections.

An object of the invention is to provide for differentially braking the front and rear wheels, as by using brakes of different types on the front and rear wheels so that the braking effect will be greater on one set of wheels than the other. Preferably the front wheels are braked less than the rear wheels, to retain a full measure of steering control over the front wheels, and in order to accentuate the difference in effect on the front and rear wheels I consider it desirable to connect an equalizing bar at one side of its center to the connections for the front and rear brakes.

Of special utility for use with the above described connections, although not necessarily so limited, is an arrangement by which the driver can operate either of two connections (1) to brake one set of wheels only, or (2) to brake all four wheels. In one illustrative embodiment of the invention, the emergency brake lever operates the rear wheel brakes only, and the service brake pedal operates all four brakes.

Another feature of the invention relates to an alternative construction in which the front and rear wheel brakes are separably connected by a device such as a detachable link, so that both sets may be operated together either by the pedal or the brake lever, or so that one set may be operated by the pedal and the other set by the lever.

The above and other features of the invention, including various novel combinations and desirable particular constructions, will be apparent from the following description of two illustrative embodiments shown in the accompanying drawings, in which:

Figure 1 is a top plan view of an automobile running-gear embodying a first modification of my invention;

Figure 2 is a view thereof, partly in side elevation and partly in longitudinal vertical section;

Figure 3 is a detail view showing on a larger scale one of the one-way pin and slot connections;

Figure 4 is a sectional view showing one of the rear wheel brakes in side elevation;

Figure 5 is a top plan view, corresponding to Figure 1, showing a second modification;

Figure 6 is a view thereof, partly in side elevation and partly in longitudinal vertical section; and Figure 7 is a sectional view on the line 7—7 of Figure 5, showing in side elevation and on an enlarged scale the above described detachable link connecting the rock-shafts which operate the front and rear wheel brakes.

In both modifications, a chassis frame 10 is connected by suitable springs with a front and a rear axle on which are mounted wheels 12 of any desired type, the front wheels carrying brake drums 14 and the rear wheels carrying brake drums 16. For reasons explained above, the brakes for the front and the rear wheels are of different types, those for the front wheels being shown as "scissors" type brakes and those for the rear wheels as "full wrapping" type brakes, the latter having the greater braking effect for the same application of power.

Each of the front wheel brakes comprises a pair of brake shoes 18, pivoted on a stud 20 mounted on a plate carried by the knuckle of the corresponding front axle, and a cam 22 arranged to turn about the axis of a telescoping horizontal rock shaft universally connected to frame 10 and journaled in said plate. A shaft of this general character is shown in Patent No. 1,437,220, granted November 28, 1922, on application of Marc Birkigt. Preferably the rock-shaft has a universal joint in vertical alinement with the king pin of the wheel, so that the cam will not be operated by steering movement of the wheel. The two cam shafts are connected by links 24 with arms 26 carried by rock-shafts journaled in the side members of frame 10, the rock-shafts having inner arms 28 connected to operating links 30.

The rear wheel brakes are of the full wrapping type and are shown as each having pivotally-connected shoes 32, opposite ends of which are engaged by a cam 34 on a shaft journaled in an arm 36 carried by the rear axle casing. The brake shoes are held against the cam by a spring 38, and when the cam is turned in a counter-clockwise direction (Figure 4) the shoes are swung against the drum by an eccentrically pivoted toggle lever 40. A spring 42 and stop 44 determine the idle position of the brake shoe. This form of full wrapping brake is claimed, and its advantages are fully set forth, in my co-pending application No. 621,776 filed Feb. 28, 1923.

The cams 34 are carried by cam shafts 46, having arms 48 (Figure 2) connected by links 50 with arms 52 on a second shaft 54. An arm 56 on this shaft is in turn operated by an adjustable link 58.

In the modification shown in Figs. 1 and 2, the links 30 which operate the front wheel brakes are connected to arms 60 on a brake-operating rock-shaft 62, and the link 58 which operates the rear wheel brakes is connected to an arm extending downwardly from a second brake operating rock-shaft 64. Each of the rock-shafts 62 and 64 has a downwardly extending arm, the two arms being connected by links 66 and 68 with opposite ends of an equalizing bar 70, to which is connected a link 72 operated by the service brake pedal 74. I prefer that the difference in braking action on the front and rear wheels be accentuated by connecting link 72 to equalizing bar 70 at one side of its center (below in Figure 1), so that more power is applied to the rear wheel brakes.

An emergency brake lever 76 is also connected by a link 78 to an arm carried by rock-shaft 64. In order that the pedal may be operated independently of the emergency lever, and in order that the emergency lever will not operate the front wheel brakes, links 8 and 78 are each connected to an arm of the form shown at 80 in Figure 3, which is slotted at 82 to act as a one way connection of the pin and slot type.

In the operation of this modification, depression of pedal 74 causes equalizing bar 70 to rock the two shafts 62 and 64 through links 66 and 68, as allowed by the pin and slot connection of link 78 to the arm on shaft 64. The shafts in turn operate through links 30 and 58 to set all four brakes, more power being applied to the rear than to the front wheel brakes. Operation of the emergency lever 76 operates only the rear wheel brakes.

In the modification shown in Figs. 5 to 7, link 58 is connected to a downwardly extending arm on a rock-shaft 90, while links 30 are connected to upwardly extending arms on a rock-shaft 92. Pedal 74 is connected by its link 72 to a downwardly extending arm on rock-shaft 92, while emergency lever 76 is connected to a downwardly extending arm on rock-shaft 90, both of these arms being slotted similar to arm 80 as shown in Figure 3 to permit independent operation of the pedal and lever when the shafts 90 and 92 are connected.

When desired, as when separate service and emergency brakes are required, these shafts are left disconnected when pedal 74 operates the front wheel brakes and emergency lever 76 operates the rear wheel brakes. When this separate operation is not necessary, shafts 90 and 92 are connected by an adjustable link 94 pivoted on arms 96 and 98 carried respectively by shafts 90 and 92 (Figure 7).

While embodiments of my invention have been described and illustrated, it is not my intention to limit its scope thereby, or otherwise than by the terms of the appended claims.

I claim:

1. A vehicle having, in combination, front wheel brakes, rear wheel brakes, two different devices for operating respectively said front and said rear wheel brakes, and a readily separable connection between said devices so that the front and rear wheel brakes may be operated either (1) together by either of said devices, or (2) independently of one another by said devices.

2. A vehicle having, in combination, front wheel brakes, rear wheel brakes, two rock-shafts arranged respectively to operate said front and rear wheel brakes, an emergency brake lever connected to one of said rock-shafts, a service brake pedal connected to the other rock-shaft, and a detachable connection between the rock-shafts.

3. A vehicle having, in combination, front wheel brakes, rear wheel brakes, two rock-shafts arranged respectively to operate said front and rear wheel brakes, an emergency brake lever connected to one of said rock-shafts, a service brake pedal connected to the other rock-shaft, and a detachable link connecting the rock-shafts.

In testimony whereof I affix my signature.

DAVID E. ANDERSON.